(12) United States Patent
Zamora Duran et al.

(10) Patent No.: US 10,621,978 B2
(45) Date of Patent: Apr. 14, 2020

(54) DYNAMICALLY GENERATED DIALOG

(71) Applicant: INTERNATIONAL BUSINESS MACHINES CORPORATION, Armonk, NY (US)

(72) Inventors: Edgar Adolfo Zamora Duran, Heredia (CR); Franz Friedrich Liebinger Portela, Heredia (CR); Yanil Zeledon, Heredia (CR); Roxana Monge Nunez, Perez Zeledon (CR)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/820,560

(22) Filed: Nov. 22, 2017

(65) Prior Publication Data

US 2019/0156821 A1    May 23, 2019

(51) Int. Cl.
| | |
|---|---|
| *G10L 15/18* | (2013.01) |
| *G06N 3/08* | (2006.01) |
| *G06F 17/27* | (2006.01) |
| *G10L 15/22* | (2006.01) |
| *G10L 15/30* | (2013.01) |
| *G10L 15/24* | (2013.01) |
| *G06F 17/28* | (2006.01) |
| *G10L 15/26* | (2006.01) |

(52) U.S. Cl.
CPC ...... *G10L 15/1815* (2013.01); *G06F 17/2735* (2013.01); *G06F 17/2785* (2013.01);
(Continued)

(58) Field of Classification Search
CPC .................................................. G10L 15/1815
(Continued)

(56) References Cited

U.S. PATENT DOCUMENTS

| | | |
|---|---|---|
| 5,383,121 A | 1/1995 | Letkeman |
| 6,418,440 B1 | 7/2002 | Kuo et al. |

(Continued)

FOREIGN PATENT DOCUMENTS

| | | |
|---|---|---|
| EP | 2879062 | 6/2015 |
| WO | 2008049834 | 5/2008 |

(Continued)

OTHER PUBLICATIONS

Pargellis, Andrew et al.; Automatic Application Generator Matches User Expectation to System Capabilities; ESCA Workshop Dialogue in Multi-Modal Systems; Jun. 22-25, 1999; 4 pages.
(Continued)

*Primary Examiner* — Susan I McFadden
(74) *Attorney, Agent, or Firm* — Schmeiser, Olsen & Watts, LLP; Mark Vallone

(57) ABSTRACT

Systems, methods and platforms for generating and improving conversational dialogs between a computer system and a user to create more intelligent, realistic human-like conversations. The systems, methods and platforms achieve a realistic human conversation by identify parameters such as the user's culture, age and known interests, identify a corpus that contains the knowledge appropriate for achieving conversational goals to a perceived topic of interest and generate expressions into dialog that may be extracted from human generated sources. The system appropriately matches the targeted user's parameters and topic based on the input of the user initiating the dialog interaction. The system may analyze and/or record the emotion of the user, cognitive context, gestures and the user's expressions, which may be performed using one or more recording systems to increase the accuracy of topic identification and the appropriate dialog responses.

20 Claims, 7 Drawing Sheets

(52) U.S. Cl.
CPC ............... *G06N 3/08* (2013.01); *G10L 15/22* (2013.01); *G10L 15/24* (2013.01); *G10L 15/30* (2013.01); *G06F 17/289* (2013.01); *G10L 15/26* (2013.01); *G10L 2015/223* (2013.01)

(58) Field of Classification Search
USPC .......................................................... 704/257
See application file for complete search history.

(56) References Cited

U.S. PATENT DOCUMENTS

| | | | |
|---|---|---|---|
| 7,167,824 B2 | 1/2007 | Kallulli | |
| 7,949,529 B2* | 5/2011 | Weider | G10L 15/22 704/270 |
| 8,010,615 B2* | 8/2011 | Jimenez | G06Q 10/107 709/206 |
| 8,332,224 B2* | 12/2012 | Di Cristo | G06F 17/273 704/257 |
| 8,620,659 B2* | 12/2013 | Di Cristo | G06F 17/273 704/257 |
| 8,676,937 B2* | 3/2014 | Rapaport | H04L 51/32 709/219 |
| 8,849,652 B2* | 9/2014 | Weider | G10L 15/22 704/9 |
| 9,355,093 B2 | 5/2016 | Reiter | |
| 9,361,589 B2* | 6/2016 | Ziolko | G06N 7/02 |
| 9,570,090 B2 | 2/2017 | Gelfenbeyn et al. | |
| 9,779,327 B2* | 10/2017 | Allen | G06K 9/6215 |
| 10,142,276 B2* | 11/2018 | Rapaport | H04L 51/32 |
| 10,187,337 B2* | 1/2019 | Smullen | H04L 67/322 |
| 2014/0229182 A1 | 8/2014 | Noble et al. | |
| 2015/0179168 A1 | 6/2015 | Hakkani-Tur et al. | |
| 2016/0171387 A1 | 6/2016 | Suskind | |

FOREIGN PATENT DOCUMENTS

| | | |
|---|---|---|
| WO | 2013119997 | 8/2013 |
| WO | 2015158878 | 10/2015 |

OTHER PUBLICATIONS

Pargellis, Andrew N. et al.; An automatic dialogue generation platform for personalized dialogue applications; Speech Communication vol. 42, Issues 3-4; Apr. 2004; pp. 329-351.

* cited by examiner

DYNAMICALLY GENERATED DIALOG

TECHNICAL FIELD

The present disclosure relates generally toward computer systems, methods and tools for generating dialog.

BACKGROUND

Today's electronic devices are able to access a large, growing, and diverse quantity of functions, services, and information using one or more electronically accessible data sources. Functionality for such devices is increasing rapidly, as many consumer devices, smartphones, tablet computers can run software applications to perform various tasks and functions to obtain information. An intelligent automated assistant also known as a virtual assistant, can provide an improved communication interface between human and computer. Such an assistant allows users to interact with a device or system using natural language, in spoken and/or text forms. Such an assistant interprets user inputs, operationalizes the user's intent into tasks and parameters to those tasks, executes services to support those tasks, and produces output that is intelligible to the user.

SUMMARY

A first embodiment of the present disclosure provides a method for dynamically generating contextual-based dialog comprising the steps of:

A second embodiment of the present disclosure provides a computer system comprising a processor; a memory device coupled to the processor; and a computer readable storage device coupled to the processor, wherein the storage device contains program code executable by the processor via the memory device to implement a method for dynamically generating contextual-based dialog comprising the steps of:

A third embodiment of the present disclosure provides a computer program product comprising: one or more computer readable hardware storage devices having computer readable program code stored therein, said program code containing instructions executable by one or more processors to implement a method for dynamically generating contextual-based dialog comprising the steps of:

DETAILED DESCRIPTION

Figure 1:
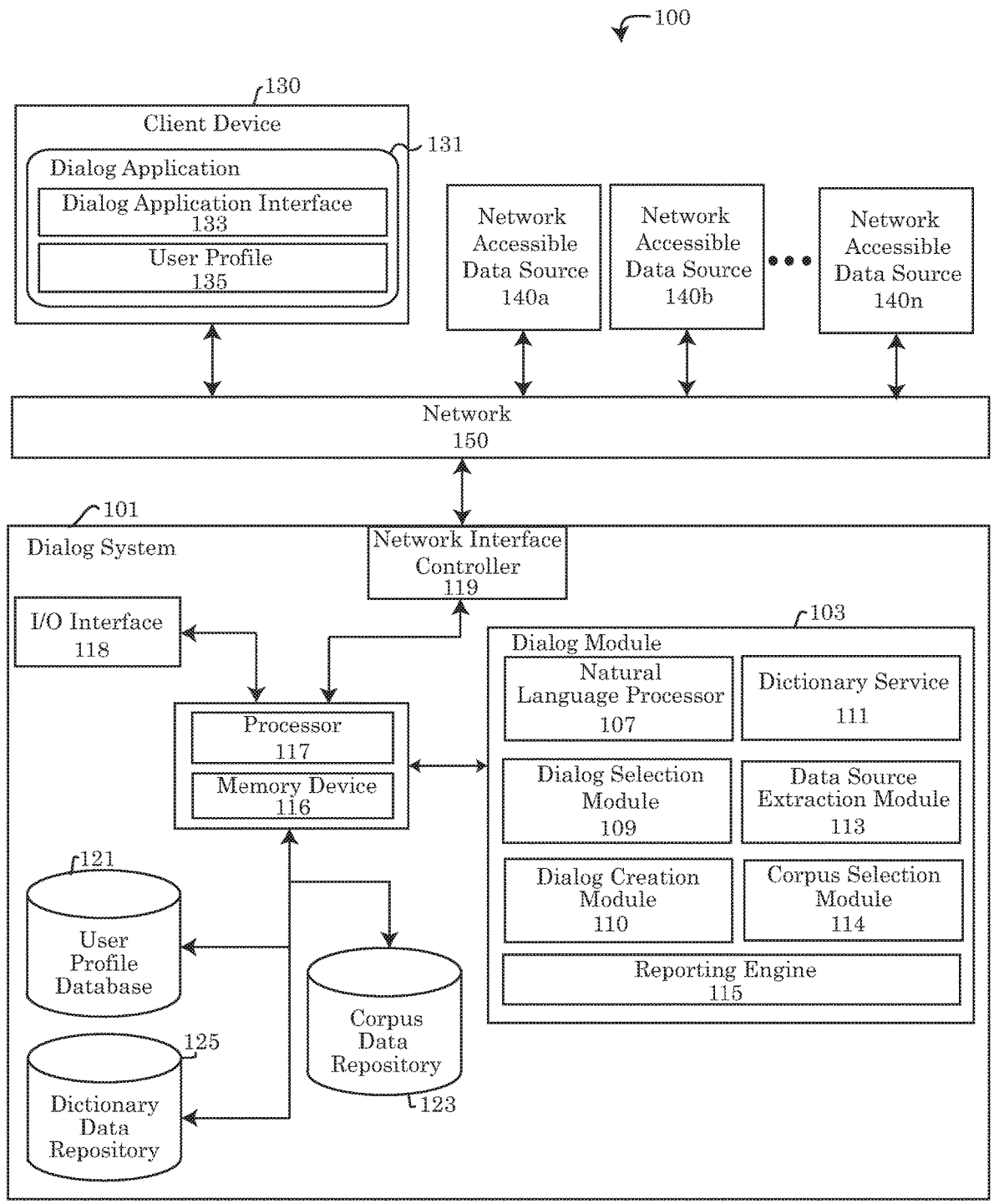
FIG. 1 depicts a diagram of an embodiment of a system for dynamically generating dialog.

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Embodiments of the present disclosure recognize that human conversation is a highly interactive activity. Humans dynamically change dialogs according to circumstances (context) as well as constantly shift to different topics rapidly during the course of a natural conversion. Conversations amongst human beings are not domain static and comprehension of a conversation may depend on the characteristics of the speaker (age, language, location, culture, etc.). Conversely, interactive machines can hold an intelligent "conversation", but an intelligent general conversation implies that a machine knows details about the topic proposed by a human user. Despite knowing a large amount of details about a topic of discussion, conversations with an interactive machine can be very rigid and interactive machines are usually not aware of subtle changes in the body language or emotions of a user the interactive machines are happens to be engaging in conversation.

The present application describes systems, methods and platforms for generating and improving conversational dialogs between a computer system and a user of the computer system, in order to create more intelligent, realistic humanlike conversations, similar to the manner in which two humans would communicate, using a cognitive platform such as Watson. The systems, methods and platforms described herein, achieve a realistic human conversation by identifying targeted parameters of the user, such as the user's culture, age, known interests, and location to select a dictionary and corpus. The system appropriately matches the targeted user's parameters and topic based on the input of the user initiating the dialog interaction.

Embodiments of the present disclosure may use natural language processing to analyze dialog presented by the user's dialog to identify topics of interest and conversational goals of the user to appropriately respond to the user's inputted dialog. Embodiments of the system may analyze and/or record the emotion of the user, cognitive context, gestures and the user's expressions, which may be performed using one or more recording systems such as a camera device or microphone to further create a more realistic flow in the dialog. Moreover, by viewing the expressions and body language, the systems of the present disclosure may become aware of more actively interesting topics to the user as well as know when to avoid topics which may be upsetting or uncomfortable for the user.

Embodiments of the present disclosure may conversationally flow better than current systems for creating computer generated dialog because the expressions used and integrated into the computer-generated dialog may be extracted from human generated sources of dialog. For example, data sources for extracting human expression may be from data sources such as social media, email, online messaging services and other electronic means for human-to-human communication. Embodiments of the system may target profiles associated with the data sources having users with similar parameters to the user engaging in the dialog services of the present disclosure. The system may use expressions created by said users of the data source, extract the expressions and filter the expressions through a selected dictionary and corpus to ensure that the extracted expressions are relevant to the current topic of interest and appropriate for the current user of the system engaging in the dialog.

System for Dynamically Creating Dialog

Referring to the drawings, FIGS. 1-5 illustrate a diagram of embodiments of a system 100, 200, 300 for dynamically creating dialog for interactive conversations with users of said system 100, 200, 300 consistent with the disclosures of this application. Embodiments of system 100, 200, 300 may comprise specialized computer systems such as a dialog system 101, client device 130, data server 201, and network accessible data sources 140*a*, 140*b* . . . 140*n* (hereinafter referred to collectively as "data sources 140"), which may each have a specialized configuration of hardware, software or a combination thereof as depicted in FIGS. 1-5 and as described throughout the present disclosure. Embodiments of the specialized computer systems 101, 130, 201, 140 may each comprise one or more elements of a generic computer system 700 of FIG. 7 (described in detail below). One or more of the elements of the generic computer system 700 may be integrated into each of the specialized computer systems 101, 130, 140, 201. Embodiments of each specialized computer systems 101, 130, 140, 201 of system 100, 200, 300 may include one or more processors 117, specialized hardware or circuitry and/or software loaded in the memory device 116 of the computer system.

Figure 2:
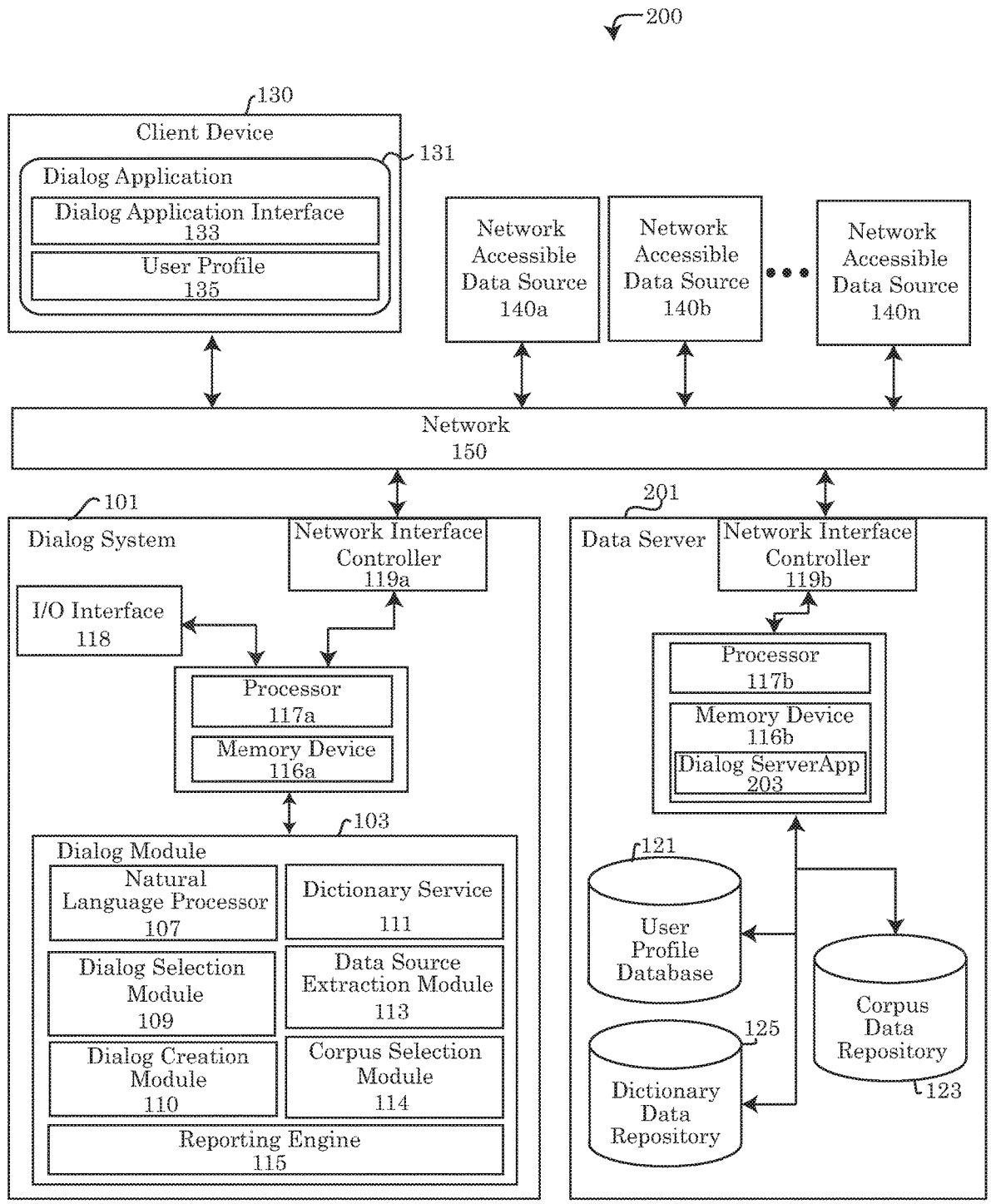
FIG. 2 depicts a diagram of an alternative embodiment of a system for dynamically generating dialog.
Figure 3:
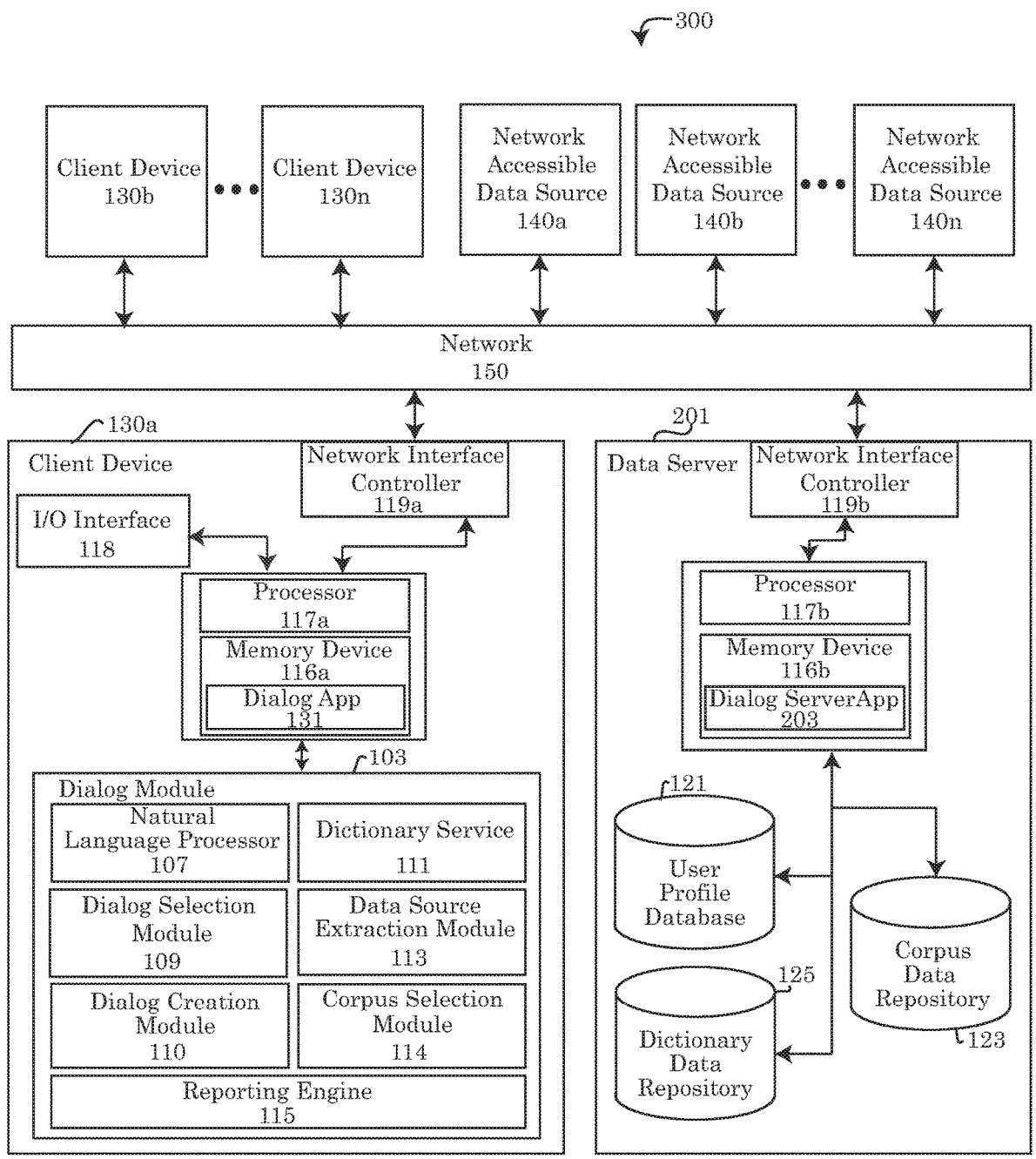
FIG. 3 depicts a diagram of a second alternative embodiment of a system for dynamically generating dialog.

Embodiments of the specialized computer systems 101, 130, 140, 201 may each be connected and placed in communication with one another over a computer network 150, as exemplified in FIGS. 1-3. Embodiments of the network 150 may be constructed using wired or wireless connections between each hardware component connected to the network 150. As shown in the exemplary embodiment of FIG. 1, a centralized computer system such as the dialog system 101 may connect to the network 150 and communicate over the network 150 with additional computer systems such as one or more client devices 130, data sources 140 or data servers 201 using a network interface controller (NIC) 119 or other network communication device. Embodiments of the NIC 119 may implement specialized electronic circuitry allowing for communication using a specific physical layer and a data link layer standard, such as Ethernet, Fiber channel, Wi-Fi or Token Ring. The NIC 119 may further allow for a full network protocol stack, enabling communication over network 150 to the dialog system 101, client device 130, data server 201 and data sources 140 or other computing hardware devices linked together through one or more communication channels.

The network 150 may facilitate communication and resource sharing among the dialog system 101, client device 130, data sources 140, data server 201 and additional hardware devices connected to the network 150, for example a network accessible storage device connected to the network 150. Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network 150 may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment may be described as follows:

Software as a Service (SaaS): the capability provided to the consumer is to use the provider's applications running on a cloud infrastructure. The applications are accessible from various client devices 130*a*, 130*b*, 130*c* . . . 130*n* (referred to as "client devices 130") through a thin client interface such as a web browser (e.g., web-based e-mail) or a dialog application interface 133 of dialog application 131. The consumer may not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 4:
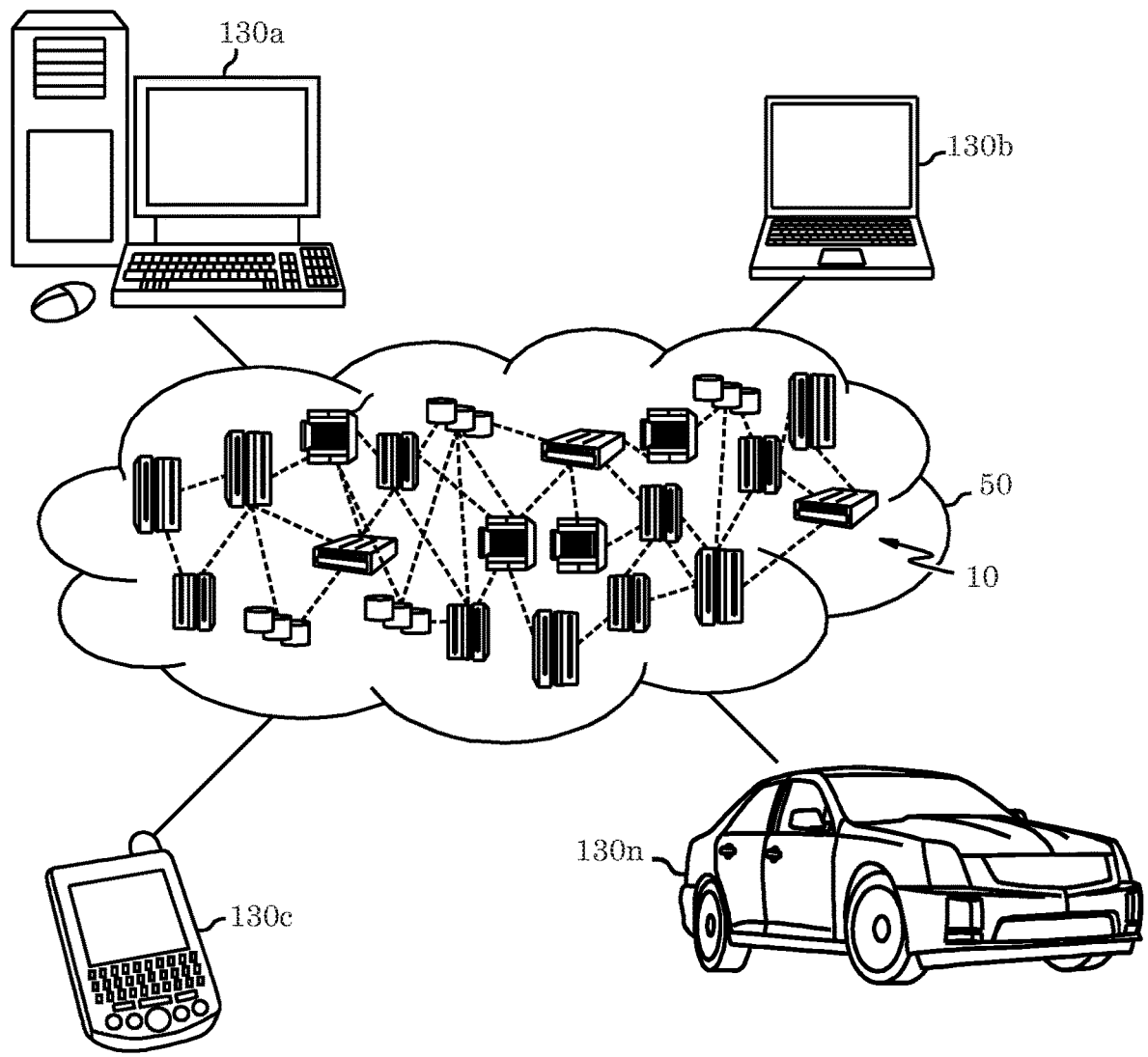
FIG. 4 illustrates an embodiment of a system for dynamically generating dialog operating in a cloud computing environment.

A cloud computing environment 50 may be service oriented with a focus on statelessness, low coupling, modularity, and semantic interoperability. At the heart of cloud computing is an infrastructure that includes a network 150 of interconnected nodes 10. Referring to the drawings, FIG. 4 is illustrative of a network 150 operating as a cloud computing environment 50. As shown, the cloud computing environment 50 may include one or more cloud computing nodes 10, which may be used by one or more cloud customers via a client device 130. For example, a desktop computer 130a, laptop computer 130b, a mobile communication device 130c, tablet computers or computer systems integrated into devices 130n as exemplified by the vehicle shown in FIG. 4.

Each node 10 of the cloud computing environment 50 may communicate with one another or may be grouped (not shown) physically or virtually, in one or more networks, such as Private, Community, Public, or Hybrid clouds as described hereinabove, or a combination thereof. The cloud computing environment 50 may offer infrastructure, platforms and/or software as services for which a cloud customer does not need to maintain resources on each client device 130. It is understood that the types of client devices 130 as shown in FIGS. 1-4, are intended to be illustrative only and that the nodes 10 of a cloud computing environment 50 can communicate with any type of client device or computerized system over any type of network 150 and/or network addressable connection (e.g., using a web browser).

Figure 5:
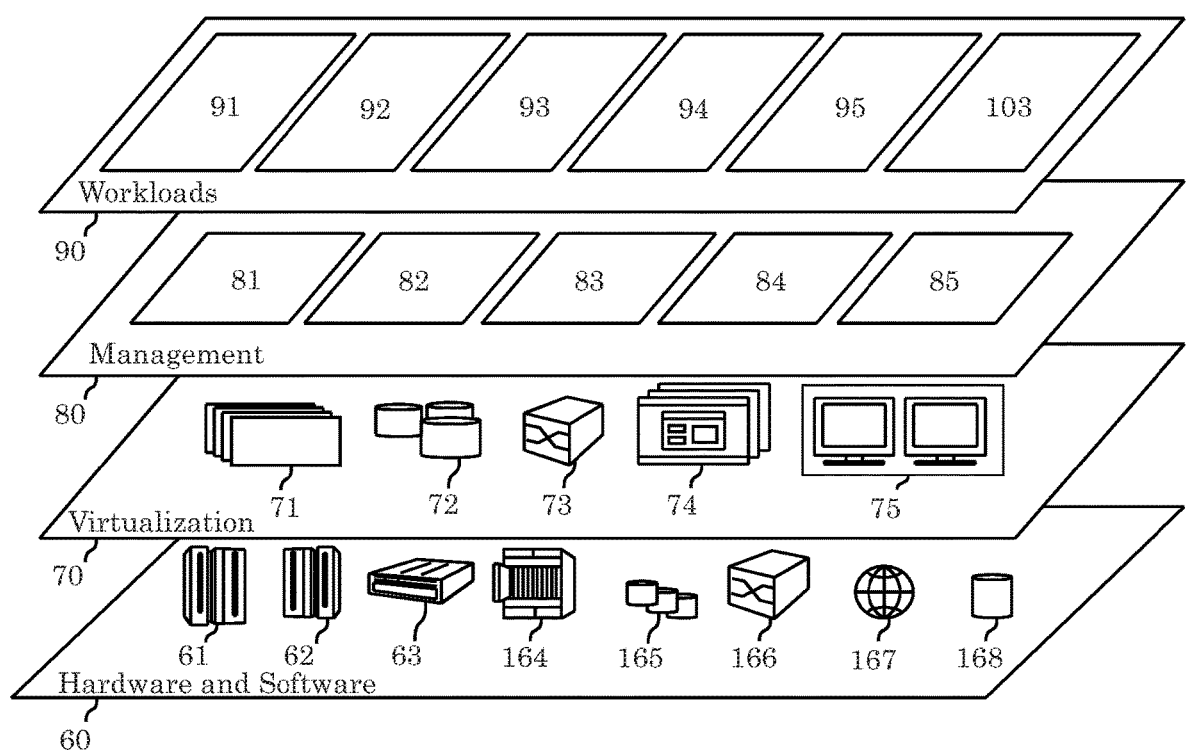
FIG. 5 illustrates an embodiment one or more abstraction layers of the cloud computing environment of FIG. 4.

Referring now to FIG. 5, a set of functional abstraction layers provided by a cloud computing environment 50 of the network 150 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources in accordance with each of the licenses of each customer and resource provisioning 81 may be utilized to perform tasks within the cloud computing environment 50. Metering and Pricing 82 provide cost tracking as resources are procured and utilized within the cloud computing environment, and billing or invoicing for consumption of these resources as point-based currency is transformed into computing resources. In one example, these resources may include virtualized hardware, virtual machines (VMs) and/or application software licenses. Security provides identity verification for cloud customers and tasks, as well as protection for data and other resources. User portal 83 provides access to the cloud computing environment 50 of the network 150 for customers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment 50 may be utilized. Examples of workloads and functions which may be provided from this layer include: records management 91; web page management 92; searching and results management 93; data analytics processing 94; profile management 95; and dialog module 103.

Referring to drawings, FIG. 1 depicts an embodiment of a system 100 for dynamically generating computer dialog. In the embodiment of FIG. 1, a centralized computer system referred to as the dialog system 101 may manage and control the receiving and transmission of computer generated dialog between one or more users interacting with the dialog system 101 of system 100 via one or more client devices 130. Embodiments of the dialog system 101 may perform the functions associated with processing the dialog inputted by the user of each client device 130, including but not limited identifying one or more perceived topics of interest to the user, an appropriate dictionary for responding to the user, retrieving a corpus of knowledge as a function of the topic of interest, identifying goals of the user for engaging in the dialog with the dialog system 101 and contextual parameters. Examples of the contextual parameters may include the user's emotions, expressions, body language and mood during the input of dialog into the client device 130. The dialog system 101 may further perform the function of creating human-like dialog by extracting previously created dialog expressions from one or more data sources 140 which may be relevant to the dialog between the user of the client device 130 and the dialog system 101. Embodiments of the dialog system may identify a plurality of additional users of a data source 140 having one or more similar characteristics to the current user engaging the dialog system 101 in a conversation. Having identified users with similar characteristics, the dialog system 101 may search the data source 140 for conversational expressions used by the similar users, extract the expressions from the data source 140 and filter the expressions through the selected dictionary and/or corpus to create human-like dialog that mimics the expressions extracted from the data sources 140. Moreover, the task of generating dialog may be performed as a function of the filtered expressions by transmitting the created dialog that has integrated one or more of the filtered expressions to the client device 130 of the user of the dialog system 101 as computer-generated dialog.

Embodiments of the dialog system 101 may include specialized hardware and/or software integrated into the dialog system 101 performing each of the functions of the dialog system 101 mentioned above and throughout this application. The specialized components of the dialog system 101, implementing each function or task of the dialog system 101, may be part of a dialog module 103. The hardware and/or software components of the dialog module 103 may include one or more sub modules in some embodiments. These sub modules may include a natural language processor 107, dialog selection module 109, dialog creation module 110, dictionary services 111, data source extraction module 113, corpus selection module 114 and reporting engine 115. As used herein, the term "module" may refer to a hardware module, software-based module or a module may be a combination of hardware and software resources of a computer system and/or resources remotely accessible to the dialog system 101 via the network 150.

Embodiments of the modules or sub modules described in this application, whether comprising hardware, software or a combination of resources thereof, may be designed to implement or execute one or more functions, tasks or routines of the dialog system 101 described herein. Embodiments of hardware-based modules may include self-contained components such as chipsets, specialized circuitry and one or more memory devices comprising a memory storage medium (described below) or memory storage device. A software-based module, may be part of a program code or linked to program code or computer code containing specific programmed instructions loaded into a memory device 116 of the dialog system 101, and/or a remotely accessible memory device of another network accessible computer system that may be accessed remotely by the dialog system 101 over the network 150.

Embodiments of the dialog module 103 may comprise a natural language processor 107. The natural language processor 107 may perform the task or function of understanding human language as the input dialog is entered into system 100 by the user via one or more client devices 130 and transmitted to the dialog system 101 over network 150. The natural language processor 107 may operate as a component of artificial intelligence and/or utilize one or more machine learning techniques, deep learning-based natural language models or any other AI techniques to improve the accuracy of the natural language processor's 107 identification of the input language, perceived topics of interest and goals of the user engaging in a conversation with the dialog system 101.

Embodiments of the natural language processor 107 may identify patterns and relevant correlations in the input data in order to improve the dialog system's 101 understanding of the language being received from a client device 130. In some embodiments, where machine learning may be used, a rule-based algorithm may be implemented to instruct the natural language processor 107 to look for specific words and phrases entered or transmitted as inputted dialog. Embodiments of the natural language processor 107 may also implement deep learning methods for processing the natural language inputs by a user which may be more flexible and intuitive, allowing for the natural language processor 107 to identify the user's intent and sentiment alongside the identification of keywords and topics of interest.

While traditional machine learning algorithms of the natural language processor 107 may be linear, deep learning algorithms may be stacked in a hierarchy of increasing complexity and abstraction. Each algorithm in the hierarchy applies a non-linear transformation on the input and uses what the natural language processor 107 learns to create a statistical model as the output. Iterations continue until the output has reached an acceptable level of accuracy. Deep learning programming is able to create complex statistical models directly from its own iterative output, allowing the natural language processor 107 to create accurate predictive models from large quantities of unlabeled, unstructured data inputted by one or more users and data sources 140. As opposed to machine learning, deep learning builds a feature set by itself without supervision or training phases used by some machine learning approaches.

Embodiments of the natural language processor 107 receiving the natural language input from a user, in the form of text, audio, video, etc. may be analyzed and processed by the natural language processor 107. The natural language processor 107 may transcribe the user's input from the inputs native format into text (if the input is not naturally provided in a text format). For example, the natural language processor may transcribe voice data recorded by a microphone into text format and identify the natural language input for context and keywords. Context derived from the natural language may include potential topics of interest, sentimentality, emotions, cognitive status, culture and age of the user, language and other conversational parameters. In some embodiments, the context, such as emotion and the user's body language may be inferred at the time the dialog input data was is entered from visual data recorded or streamed to the dialog system 101. For example, a video camera or recording system integrated into or in communication with either the client device 130 or dialog system 101 may view and/or record images and video of the user during input of the dialog (or throughout the entire conversation). The natural language processor 107 or analytics module of the natural language processor 107 may scan recorded images and video data for contextual clues about the user's emotions, body language, cognitive status, visual demeanor or any other visual cues and report one or more conclusions drawn by the analysis of the images and/or recorded data which may assist the dialog system 101 with creating dialog in response to the user's input.

For example, a user may transmit dialog via a client device 130. While typing or speaking into the client device, a user may express a smile, frown, tears, an angry, sad, happy or other demeanor while inputting certain portions of the dialog. The dialog system 101 may analyze the demeanor of the user during the input to identify portions of the dialog for topics that may be of interest to the user or topics to avoid. For instance, if a user during an input of dialog has a particularly sad or angry demeanor while inputting dialog related to a certain topic, the analytics module may cue the dialog system to avoid topics associated with making the user upset or angry. Likewise, topics perceived as generating a positive or happy demeanor from the user may be targeted for further discussion by the dialog system 101. The following table provides an example of information that determined from the conversational input provided by a user:

TABLE 1

INITIAL CONVERSATION INFORMATION

| User | Conversation | Information determined by natural language processor |
|---|---|---|
| Mike | S: Good morning Mike, how are you today?<br>M: I'm fine, thank you<br>S: How can I help you?<br>M: I need some details about the medical exams I took yesterday.<br>S: Sure, right away . . . | Emotion: 50% happy, 20% angry, 30% anxious<br>Topic: medicine, medical exam results |
| Julia | S: Good morning Julia, how are you today?<br>J: I'm fine, thank you<br>S: How can I help you?<br>J: Give me the results of the medical exams last Monday<br>S: Sure, right away . . . | Emotion: 20% happy, 40% angry, 40% anxious<br>Topic: medicine, medical exam results |

Embodiments of the dialog module 103 may further comprise a dialog selection module 109. The dialog selection module 109 may be perform the functions and tasks associated with selecting an appropriate type of dialog created by the dialog creation module 110 in accordance with the topics of interest, contextual parameters and conversational goals identified by the natural language processor 107. Embodiments of the dialog selection module 109 may receive one or more potential topics of interest and contextual parameters (i.e. emotions, gestures, body language, etc.) from the natural language processor 107.

Additionally, the dialog selection module 109 may further query one or more additional databases for any known or existing knowledge about the user of supplying the conversational inputs into the dialog system 101. For example, the dialog selection module 109 may receive information about the user of the client device 130 communicating with the dialog system 101 based on the user profile 135 loaded into a memory device onboard the client device 130 as shown in FIG. 1-3. The user may fill in the user profile 135 themselves or the user profile 135 may store data about the user automatically based on the user's actions. Information stored by the user profile 135 may be transmitted to the dialog selection module 109 and may include information regarding the user's age, location, culture, topic preferences, viewing history, preferred idioms, or any other user information that may be collected by a user's client device 130.

In some embodiments, the system 100 may collect and store information about a user based on not only the user's previously known information stored by the user's profile but also past conversations, preferences and interactions between the user and the dialog system 101. The dialog system 101 learns and adapts each time a repeat user interacts with the dialog system 101, improving dialog generation and continuously customizing dialog to the specific user. Information about each user may be stored in as entries of the user profile database 121 which may be periodically updated by the dialog system 101. Embodiments of the dialog selection module 109 may retrieve information entered into the user profile data base 121 and load the information associated with the database entry into the memory device 116 and/or transmit the retrieved data from the user profile database 121 to the dialog creation module 110. The following table provides an example of information that may be formatted and stored in the user profile database for a plurality of users:

TABLE 2

KNOWN USER INFORMATION

| User | Known Information | Previously learned information |
|---|---|---|
| Mike | Culture: European<br>Age: 24<br>Location: NY<br>Education: High School<br>Profession: Mechanic | Topics of interest: athletics, cars, science fiction, reading books, cooking, history, cultures<br>Topics to avoid: architecture, politics, cats |
| Julia | Culture: Latin American<br>Age: 36<br>Location: Florida<br>Education: Master's Degree<br>Profession: Nurse | Topics of interest: science, medicine, travel, food, environment protection<br>Topics to avoid: athletics, cars, military |

Embodiments of the dialog creation module 110 may be a sub-module of the dialog module 103 and may be responsible for creating, organizing, formatting and transmitting one or more dialog responses to the user's conversational input. The creation of the dynamically generated dialog may be as a function of the user's natural language input (referred to also as conversational input), contextual parameters identified by the natural language processor 107 and known user information previously stored by the user profile 135 and user profile database 121. Embodiments of the dialog creation module 110 may utilize known information about the user and information identified by the natural language processor 107 to retrieve an appropriate dictionary, corpus of information relating to perceived topics of interest and one or more expressions available from a data source 140. The expressions obtained from the data source(s) 140 may be used as a template for constructing improved dialog that appears indistinguishable from dialog written by a human user.

Embodiments of the dialog creation module 110, may retrieve the appropriate dictionary for the conversation between the dialog system 101 and the user, via a dictionary service 111. The dictionary may be selected by the dictionary service 111 as a function of the language parameters identified by the natural language processor 107 and previously known information about the user gathered by the dialog selection module 109. The dialog creation module 110 may transmit a system call to the dictionary service 111 along with identified language information in order to select the appropriate dictionary for continuing the conversation. The dictionary service 111 may query the dictionary data repository 125 storing one or more dictionaries for use by the dialog system 101 to create subsequent dialog, by the dialog creation module 110.

Based on the language information discerned from the conversational input and known information about the user stored in the user profile 135 and user profile database 121, the dictionary service 111 may select a corresponding dictionary from the dictionary data repository 125 having an appropriate language and level of sophistication for carrying on a conversation with the user. For instance, the dictionary selected may be identified as an appropriate level of sophistication based on the educational level and/or age of the user in some embodiments. The selected dictionary may be loaded into the memory device 116 of the dialog system 101 and/or loaded into a memory device integrated into the hardware of the dialog module 103. For example, the appropriate dictionary for responding to the user input may be a dictionary for a native English speaker. The level of English may be determined based on both the conversational input itself (i.e. the input has been written in English) and in the user profile 135, the user has stated that the user speaks English and/or resides in an English speaking country. Thus, based on these parameters, the dialog creation module 110 may use the dictionary service 111 to retrieve an appropriate English dictionary for generating responsive dialog to the user's conversational input. Each dictionary may be defined by the set of expressions, grammatical constructions, words, and complexity of the language. The following table provides an example of a dictionary selection based on the known information about a particular user:

TABLE 3

| SELECTED DICTIONARIES | | |
|---|---|---|
| Dictionary | Mike | Julia |
| Age: 10-15 years Spanish, general | | |
| Age: 20-30 years English, American slang | X | |
| Age: 20-30 years English, American standard | X | |
| Age: 15-30 years Spanish, simple | | |
| Age: 30-50 years Spanish, professional | | X |
| Age: 20-30 years English, general | | |

Alternatively, in some scenarios, English may not be an appropriate dictionary to select by the dialog creation module 110. For example, the user may be conversing with the dialog system 101 in another foreign language, such as Italian for instance. The user may be a native English speaker in this example and reside in a predominantly English-speaking country, however, the user may be interacting with the dialog system to improve the user's Italian skills (i.e. using the dialog system as a tutor). The conversational input provided by the user may be written to the dialog system in Italian (or another foreign language being inputted by the user). The users' profile 135 or past conversations with the dialog system in Italian may indicate the user's level of comprehension of the Italian language. Based on previous interactions with the dialog system 101 in the foreign language, the dialog creation module 110 may select an Italian dictionary comprising words at an appropriate level for the user to understand based on the user's current skill set in order to create an appropriate dialog that may be understood by the user.

Embodiments of the dialog creation module 110 may not only select and retrieve an appropriate dictionary via the dictionary service 111, to create a responsive dialog to the user, the dialog creation module 110 may also facilitate the selection of an appropriate corpus comprising knowledge and information associated with each of the perceived topic(s) of interest identified by the natural language processor 107. The corpus may be selected as a function of the conversational input of the user, contextual parameters (such as emotion, gestures, body language, etc. of the user) and previously collected data about the user stored by the user profile database 121. To select a corpus corresponding to a perceived topic of interest, the dialog creation module 110 may transmit a system call to the corpus selection module 114. The corpus selection module 114 may perform the function or task of analyzing the perceived topic(s) of interest, querying a corpus data repository 123 for one or more topics, keywords, metadata, classifying the knowledge of a particular topic or other data identifying the nature of the corpus in relation to a topic of interest. The corpus selection module 114 may select an appropriate corpus from a corpus data repository 123 based on the query results and load the selected corpus comprising the available knowledge on the perceived topic of interest into the memory device 116 of the dialog system 101. The following table provides an example of a list of existing corpuses available for selection by the corpus selection module 114:

TABLE 4

| CORPUS SELECTION | |
|---|---|
| Existing Corpus Set | Selected Corpus Topic |
| Athletics | |
| Health-Cancer | |
| Health-General | X |
| Insurance | |
| Energy | |
| Books | |

TABLE 5

| Corpus, Health-General | | | |
|---|---|---|---|
| Category | Known Info | Mike | Julia |
| Red blood cells | M: 5-6 million cells/mcL F: 4-5 million | 5.5 million | 4.5 million |
| White blood cells | 4500 to 10000 | 6000 | 8000 |
| Platelets | 140000 to 450000 cells/mcL | 145000 | 200000 |
| Hemoglobin | M: 14-17 g/dL F: 12-15 g/dL | 15 | 13 |
| Hematocrit | M: 41-50% F: 36-44% | 42% | 37% |
| Mean corpuscular volume | 80 to 95 femtoliter | 89 | 87 |
| Plasma Glucose | 70 to 99 normal 100 to 199 prediabetes 126+ diabetic | 80 | 98 |

In some embodiments of the dialog system 101, the dialog module 103 may further comprise a data source extraction module 113. The data source extraction module 113 may perform the function or task of searching one or more data sources 140 accessible to the dialog system via network 150, for expressions of human generated dialog (written, spoken, recorded, etc.) to improve the creation of dialog by the dialog creation module 110 in response to the user's conversational inputs. The dialog system 101 may retrieve, parse and integrate human expressions into dialogs by the dialog creation module 110 in order to sound more humanlike and emulate the dynamic ability of human expression found naturally in interactions between humans during conversation. A data source 140 may be any computerized source of information that may be useful for extracting, inferring or implying the structure or cultural norms of human speech, writing and dialog, including popular sayings, expressions and slang. Examples of some appropriate data sources may include websites, social media, email, messaging services, online forums, message boards and online communities.

Embodiments of the data source extraction module 113 may target the extraction of expressions to users of a data source 140 which may comprise one or more similar parameters or information that may be shared-in-common with the current user of the dialog system 101. For example, the data source extraction module 113 may specifically seek out users sharing common traits with the current user of the dialog system, such as a similar age, location, culture and interests. Each of the expressions extracted from the data sources 140 may be saved or stored by the data source extraction module 113 in one or more data storage devices, data repositories, databases or other data structures for subsequent retrieval and use by the dialog creation module 110 during the generation of dialog in response to the user's conversational input.

During the generation of dialog by the dialog creation module 110, one or more expressions extracted from the data sources 140 and stored by the data source extraction module 113 may be filtered through the dictionary selected by the dictionary service 111 and/or the corpus selected by the corpus selection module. By filtering each extracted expression through both the dictionary and corpus, the dialog system 101 and the dialog creation module 110 in particular, may ensure that the extracted expressions are within the parameters of the dictionary used to respond to the user and appropriately make sense within the context of the topics of interest. Moreover, filtering each extracted expressions through the dictionary may also translate the expressions from the expression's native language to the language of the dictionary selected.

Embodiments of the dialog module 103 may, in some embodiments, further comprise a reporting engine 115. The reporting engine 115 may perform the function and tasks associated with transmitting or one more created dialogs generated by the dialog creation module 110 to the client device 130 via the network 150. Moreover, in some embodiments, the reporting engine 115 may also prepare and report statistical information about past or present dialog interactions with user. For example, the reporting engine may collect data about the types of users, the most common topics of interest, languages, patterns of user interaction, the most common expressions used during the dialog, satisfaction of user goals and the outcome of dialogs between the user and the dialog system. Embodiments of the reporting engine 115 may also track the statistical information about the user and/or user's client device 130. The reporting engine 115 may generate and display reports to a user or administrator of the dialog system 101, which may allow for the dialog system 101 to modified or improved to further be customized in view of the most frequent or expected uses of the dialog system 101.

As discussed above, embodiments of system 100, 200, 300 may comprise one or more client devices 130 which may electronically communicate with the dialog system 101 to send and receive one or more dialogs throughout the course of the use of the system 100, 200, 300. A client device 130 may be any computing device or system capable of sending dialog inputs provided by user input into the client device 130 and receiving dialog from the dialog system 101 in response to said inputs. Examples of client devices may include desktop computer, laptop computers, mobile computing devices, cellular telephones (such as a smartphone), network enabled media devices, tablet computers, computing devices integrated into consumer goods such as vehicles, home appliances, television sets, etc.

Embodiments of client devices 130 may be configured to include a dialog application 131 or program loaded into a memory device of the client device 130. The dialog application may be any program or application capable of sending, receiving and/or displaying the conversations transmitted between the client device 130 and the dialog system 101. The dialog application 131 loaded into the memory device of the client device may include a graphical user interface (GUI), referred to as a dialog application interface 133 in the figures. The GUI of the dialog application interface 133 may create and/or display graphical representations of the dialog inputted by the user into the client device 130 as well as display the dialog received in return from the dialog system 101. As shown in FIG. 1, the dialog application 133 may be a GUI that is integrated into the dialog application 131. In alternative embodiments, the dialog application 131 may be remotely accessible over a cloud computing environment, wherein the GUI of the application interface may be accessed and viewed using a thin client, such as a web browser.

FIG. 2 depicts an alternative embodiment 200 of the system 100 of FIG. 1. The difference between system 100 and system 200 may be that system 100 may be a centralized system which includes both the dialog module 103 and the data repositories such as the user profile database 121, corpus data repository 123 and the dictionary repository 125. System 200 on the other hand may separate the dialog system 101 from each of the data repositories, instead hosting the user profile database 121, corpus data repository 123 and dictionary data repository 125 on a network accessible data server 201 which may be running a dialog server application 203 loaded into the memory device 116b. Dialog server application 203 may be programmed with instructions for sending, receiving, updating and storing data in the Corpus data repository 123 and dictionary data repository 125. During the identification and selection of the appropriate dictionary, corpus and previously known user information. The dialog system 101 may communicate with the data server 201 to request and retrieve the information stored by the user profile database 121, corpus data repository 123 and dictionary data repository 125, which may be transmitted back to the dialog system 101 over the network 150.

Referring to FIG. 3, system 300 differs from systems 100 and 200 by integrating and processing each of the tasks and functions of the dialog system 101 as part of one of the client devices 130a, 130b . . . 130n (which may each be referred to generally as client device 130) connected to the network 150. Rather than dedicating resources to a separate dialog system 101, the dialog application 131 loaded into the memory device 116a of each client device 130 may interact with a locally operating dialog module 103 running each of the functions previously dedicated the dialog system 101 as described above. Similar to the client device 130 of system 200, the client devices 130 of system 300 may query, access and retrieve data stored by the user profile database 121, corpus data repository 123 and dictionary data repository 125 via the data server 201. Moreover, in some embodiments, the client device 130 may locally store the user profile database 121, corpus data repository 123 and dictionary data repository 125 in one or more local data storage devices of the client device 130.

Method for Dynamically Generating Dialog

Figure 6:
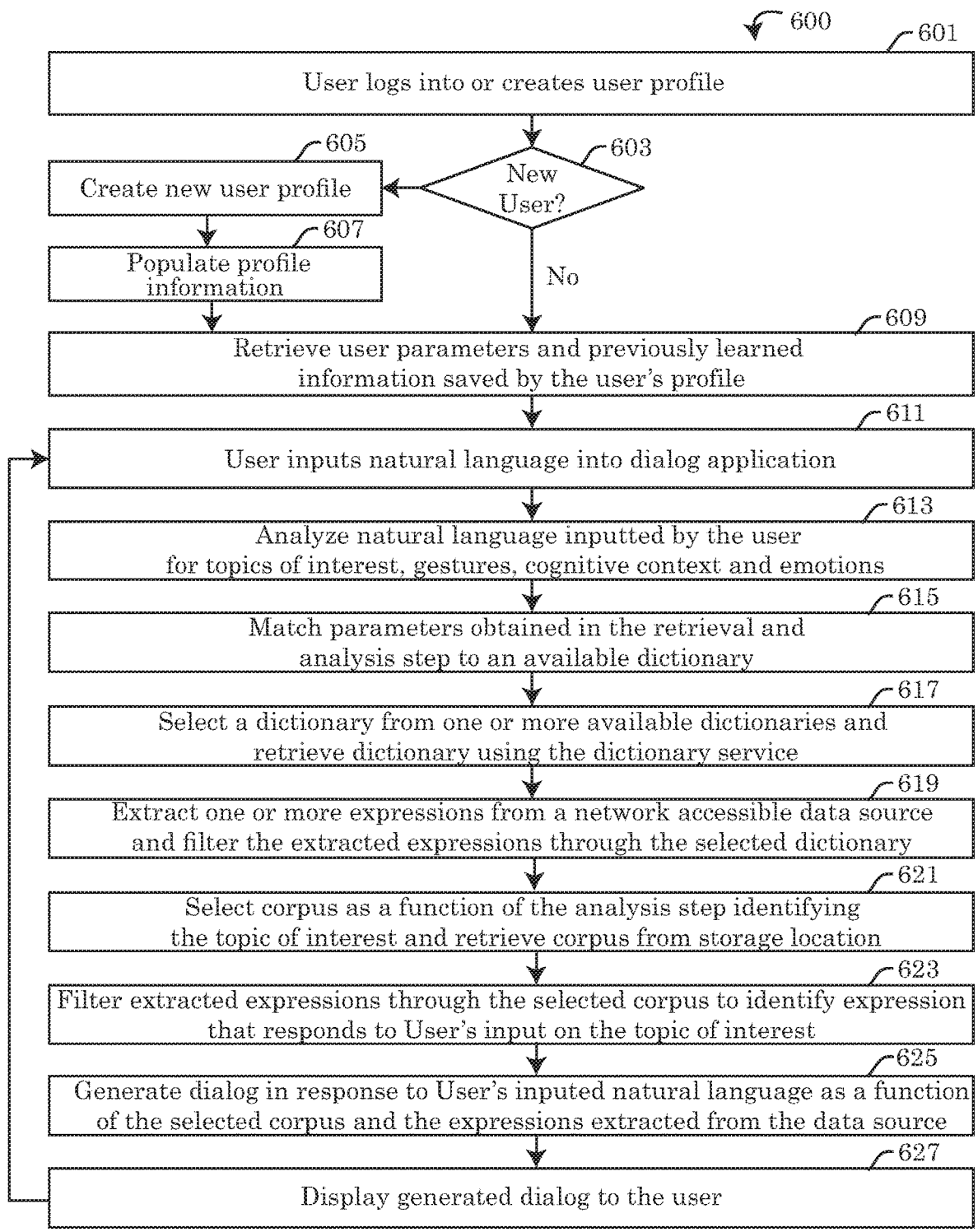
FIG. 6 depicts an embodiment of an algorithm for dynamically generating dialog.

The drawing of FIG. 6 represents an embodiment of an algorithm 600 that may be implemented for dynamically generating dialog, in accordance with the systems 100, 200, 300 described in FIGS. 1-5 using one or more computer systems defined generically in FIG. 7 below, and more specifically by the specific embodiments depicted in FIGS. 1-5 described above. A person skilled in the art should recognize that the steps of the method described in FIG. 6 may not require all of the steps disclosed herein to be performed, nor does the algorithm 600 of FIG. 6 necessarily require that all the steps be performed in the particular order presented. Variations of the method steps presented in FIG. 6 may be performed in a different order than presented by FIG. 6.

The algorithm 600, described in FIG. 6, may initiate at step 601. In step 601, a user of a client device 130 may open a dialog application 131 and log into an existing user profile 135 of the dialog application 131 or create a new user profile capable of tracking and storing information about the user's preferences and past experiences using the dialog application 131 associated with system 100, 200, 300. In step 603, a determination may be made by the algorithm 600 whether or not the user attempting to access the dialog application 131 is a new user or an existing user. If the user accessing the dialog application 131 is an existing user, the user may present one or more types of credentials that may allow the user to load the existing user profile 135 into the memory device of the client device 130. For example, a user having an existing user profile 135 associated with the dialog application 131 and/or the dialog system's 101 services may present a login/password combination, swipe or scan a key card, present biometric identification such as a fingerprint scan, iris scan, voice imprint or other identifying credentials to access the user profile. Once an existing user has been identified, the credentials have been confirmed and the user profile 135 has been loaded, the algorithm 600 may proceed to step 609 (described in more detail below).

Conversely, if the user attempting to log into a user profile 135 associated with a dialog application 131, loaded into the memory device of the client device, is a brand-new user unaffiliated with an existing profile, the algorithm may proceed from step 603 to 605. In step 605, the new user may be prompted to create a new user profile 135. As part of the creation process, the system 100, 200, 300 may request identifying information about the user, user preferences or request permission for access to information that may assist the dialog system 101 to create an improved dialog with the user. In step 607, the new user may proceed to populate the user profile by inputting requested information, user preferences, topic of interest and granting permissions for the dialog system 101 to access one or more features of the client device 130, including the camera system, microphone, email system and browser history.

The algorithm 600 may proceed from step 607 or directly from step 603 (in some instances) to step 609. In step 609 of the algorithm 600, the dialog module 103 may retrieve the user profile 135 comprising descriptive characteristics of the user, and previously known information about the user from the client device 130 and/or retrieve the user profile 135 from a data repository or network accessible storage device such as the user profile database 121. The retrieved user profile 135 and known user information stored by the user profile database 121 may be loaded into the memory device 116 of the dialog system 101 in order to further influence the context surrounding the creation of dialog and improve the responses to the user's input by the dialog creation module 110.

In step 611, a user may provide a natural language input into the dialog application 131. The natural language input may be transmitted via network 150 to the natural language processor 107. The natural language inputted into the dialog application 131 or the dialog application interface 133 may be in the form of text inputted directly by the user via an input device (keyboard, virtual keyboard, touch screen), audio recorded by an audio recording system which may comprise a microphone, wherein the audio recording may be converted to text using a speech-to-text translation. In some embodiments, step 611 may further comprise recording or saving images or video data recorded by a camera of a video recording system in conjunction with the text or speech input. The images or video data may be used to identify contextual parameters of the user's input, such as a users' emotions, body language and gestures.

In step 613, the natural language processor 107 of the dialog module 103 may analyze the natural language inputted by the user in step 611. Embodiments of the natural language processor 107 may use machine learning, deep analysis and other artificial intelligence techniques to parse the input by the user for keywords and understand the relevance of the input being provided. The natural language processor 107 may, identify one or more topics of interest, conversational goals of the user, contextual parameters such as gestures, emotions, body language cues, languages being inputted, and/or a user's cognitive status. The natural language processor 107 may also transcribe audio, images and video data recorded by the client device 130 into text or tag the data with meta data identifying one or more important features about the input that may influence the dialog created in response to the user's input. For example, the natural language processor may tag image and video data with meta data identifying a particular type of body language or emotional context as the user was speaking or writing the input data into the dialog application's 131 interface 133.

Embodiments of the algorithm 600 may subsequently, in step 615 match parameters of the input obtained through the analysis of the natural language input during step 613 in view of one or more parameters and/or information stored by the user profile 135 to identify a dictionary best suited for created a response dialog to the user's input. In step 617, a dialog selection module 109 may perform a system call to a dictionary service 111 to select one or more available dictionaries from a dictionary data repository 125. The dictionary service 111 may retrieve each of the dictionaries instructed by the dialog selection module 109 and load the selected dictionaries into the memory device 116 or memory device onboard the dialog module 103.

Embodiments of the algorithm 600 may in step 619 may further search, identify and extract one or more or more expression from a network accessible data source 140 via the data source extraction module 113. The data source extraction module 113 may view expressions from multiple data sources 140 and/or may target expressions that may have been specifically generated by data source users that may have similar parameters to the users of the system 100, 200, 300 that are currently engaging the system 100, 200, 300 in a dialog. Moreover, in some embodiments, the data source extraction module 113 may specifically target expressions that are relevant to a perceived topic of interest for the dialog or expressions that are within the scope of the dictionary selected in step 617. In some embodiments, the data source extraction module 113 may filter each of the extracted expressions from one or more data sources 140 through the selected dictionary retrieved in step 617, wherein only extracted expressions relevant to the selected dictionary are incorporated into the dialog created by the dialog creation module 110.

In some embodiments, the algorithm 600 may comprise step 621, wherein the corpus selection module 114 may select a corpus from the corpus data repository 123 that most closely relates to one or more of the perceived topics of interest. The corpus may be selected as a function of the analysis step 613, the user parameters and information stored by the user profile 135 retrieved in step 609, wherein the topic of interest has been identified. The corpus may be retrieved from the corpus data repository 125 or another storage location and loaded into the memory device 116 or another on board memory device of the dialog module 103. Subsequently, in step 623, the extracted expressions of step 619 may also be filtered through the selected corpus to identify each extracted expression that may be relevant to the user's natural language input of step 611 and the topic of interest.

Embodiments of algorithm 600 may continue to step 625, wherein the dialog creation module generates human-like dialog in response to the user's natural language input of step 611 as a function of the selected corpus, dictionaries and expressions extracted from each data source that are relevant to the user's input and topic. The generated dialog of step 625 may be transmitted over network 150, wherein the dialog is received by a client device 130. The client device 130 may in step 627 display the generated dialog to the user via the GUI of the dialog application interface 133. In response to the receipt of the generated dialog of step 627, the user may respond to the dialog with another natural language input into the client device 130, wherein algorithm 600 may return to 611 and repeat using the newly inputted dialog to generate a subsequent response to be displayed to the user.

Computer System

Figure 7:
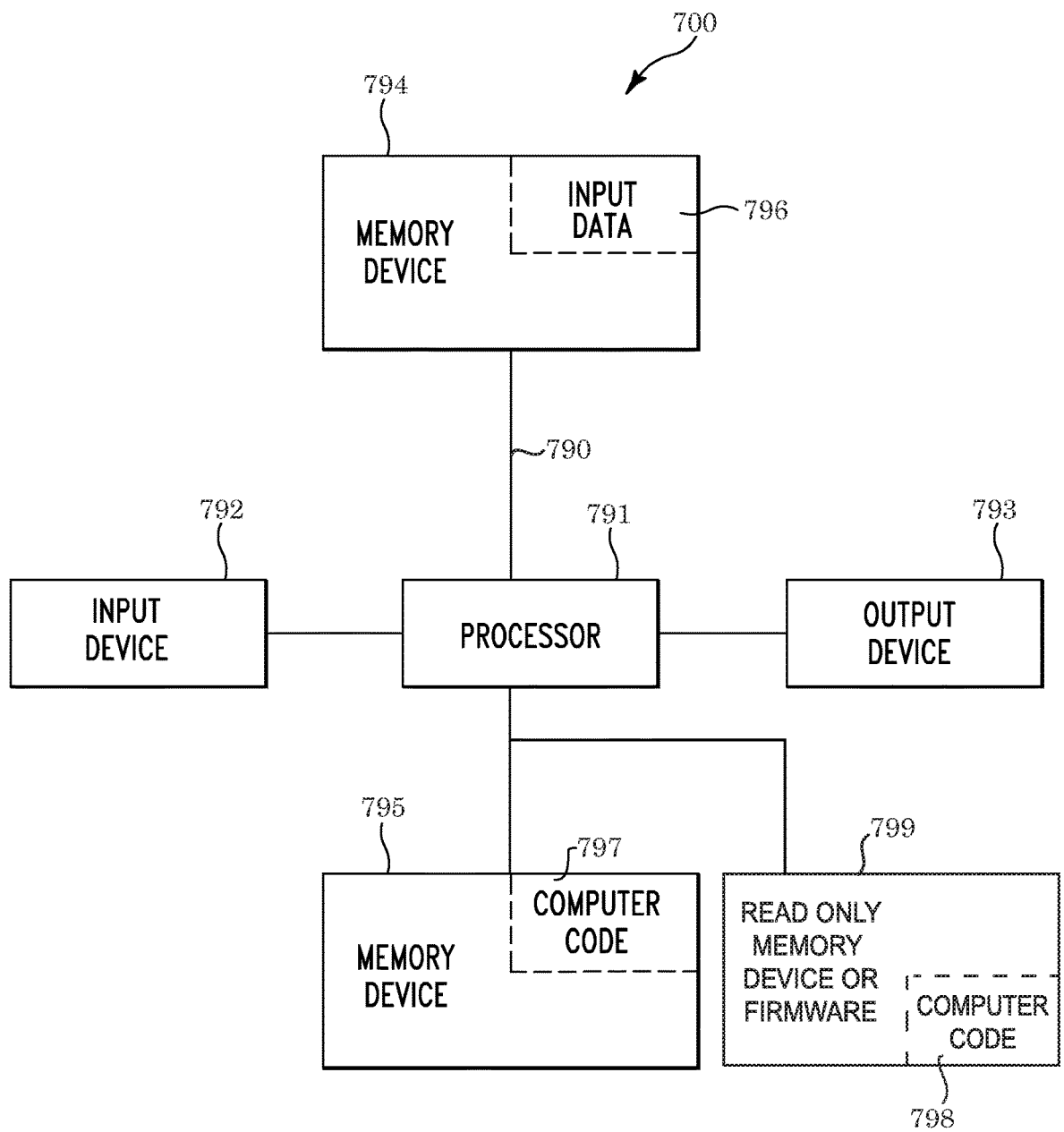
FIG. 7 depicts a block diagram of a computer system able to implement the methods for dynamically generating dialog, consistent with the disclosure of the present application.

Referring to the drawings, FIG. 7 illustrates a block diagram of a computer system 700 that may be included in the systems of FIGS. 1-5 and for implementing the methods for dynamically generating computerized dialog described in the algorithm 600 of FIG. 6 and in accordance with the embodiments described in the present disclosure. The computer system 700 may generally comprise a processor 791, otherwise referred to as a central processing unit (CPU), an input device 792 coupled to the processor 791, an output device 793 coupled to the processor 791, and memory devices 794 and 795 each coupled to the processor 791. The input device 792, output device 793 and memory devices 794, 795 may each be coupled to the processor 791 via a bus 790. Processor 791 may perform computations and control the functions of computer 700 including executing instructions included in the computer code 797 for tools and programs for s dynamically generating computerized dialog, in the manner prescribed by the embodiments of the disclosure using the systems of FIGS. 1-5. The processor 791 via memory device 795 may execute the instructions of the computer code 797. The computer code 797 may include software or program instructions that may implement one or more algorithms for implementing the methods for dynamically generating computerized dialog, as described in detail above and in FIG. 6. The processor 791 executes the computer code 797. Processor 791 may include a single processing unit, or may be distributed across one or more processing units in one or more locations (e.g., on a client and server).

The memory device 794 may include input data 796. The input data 796 includes any inputs required by the computer code 797, 798. The output device 793 displays output from the computer code 797, 798. Either or both memory devices 794 and 795 may be used as a computer usable storage medium (or program storage device) having a computer readable program embodied therein and/or having other data stored therein, wherein the computer readable program comprises the computer code 797, 798. Generally, a computer program product (or, alternatively, an article of manufacture) of the computer system 700 may comprise said computer usable storage medium (or program storage device).

Memory devices 794, 795 include any known computer readable storage medium, including those described in detail below. In one embodiment, cache memory elements of memory devices 794, 795 may provide temporary storage of at least some program code (e.g., computer code 797, 798) in order to reduce the number of times code must be retrieved from bulk storage while instructions of the computer code 797, 798 are executed. Moreover, similar to processor 791, memory devices 794, 795 may reside at a single physical location, including one or more types of data storage, or be distributed across a plurality of physical systems in various forms. Further, memory devices 794, 795 can include data distributed across, for example, a local area network (LAN) or a wide area network (WAN). Further, memory devices 794, 795 may include an operating system (not shown) and may include other systems not shown in the figures.

In some embodiments, rather than being stored and accessed from a hard drive, optical disc or other writeable, rewriteable, or removable hardware memory device 794, 795, stored computer program code 798 (e.g., including algorithms) may be stored on a static, non-removable read-only storage medium such as a Read-Only Memory (ROM) device 799, or may be accessed by processor 791 directly from such a static, non-removable, read-only medium 799. Similarly, in some embodiments, stored computer program code 797 may be stored as computer-readable firmware 799, or accessed by processor 791 directly from such firmware 799, rather than from a more dynamic or removable hardware data-storage device 795, such as a hard drive or optical disc.

In some embodiments, the computer system 700 may be further coupled to an Input/output (I/O) interface (for example I/O interface 118) and a computer data storage unit (for example a data store, data mart or repository). An I/O interface 118 may include any system for exchanging information to or from an input device 792 or output device 793. The input device 792 may be, inter alia, a keyboard, joystick, trackball, touchpad, scanning device, bar code reader, mouse, sensors, beacons, RFID tags, microphones, recording device, biometric input device, camera, microphone, timer, etc. The output device 793 may be, inter alia, a printer, a plotter, a display device (such as a computer screen or monitor), a magnetic tape, a removable hard disk, a floppy disk, etc. The memory devices 794 and 795 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus 790 may provide a communication link between each of the components in computer 700, and may include any type of transmission link, including electrical, optical, wireless, etc.

The I/O interface 118 may allow computer system 700 to store information (e.g., data or program instructions such as program code 797, 798) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to dynamically generating computerized dialog. Thus, an embodiment of the present invention discloses a process for supporting computer infrastructure, where the process includes providing at least one support service for at least one of integrating, hosting, maintaining and deploying computer-readable code (e.g., program code 797, 798) in a computer system (e.g., computer 700) including one or more processor(s) 791, wherein the processor(s) carry out instructions contained in the computer code 797 causing the computer system to dynamically generate computerized dialog. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for sharing medical costs with a medical network as described in this application. Thus the present invention discloses a process for supporting, deploying and/or integrating computer infrastructure, integrating, hosting, maintaining, and deploying computer-readable code into the computer system 700, wherein the code in combination with the computer system 700 is capable of performing a method of sharing medical costs with a medical network.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method for dynamically generating computerized dialog comprising the steps of:
    receiving, by a processor, natural language input by a user;
    retrieving, by the processor, stored information previously known about the user inputting the natural language input;
    analyzing, by the processor, the natural language input for topics of interest and cognitive context;
    selecting, by the processor, a dictionary as a function of the natural language input and the stored information previously known about the user;
    further selecting, by the processor, a corpus comprising knowledge of the topics of interest;
    extracting, by the processor, one or more expressions from a network accessible data source;
    filtering, by the processor, the one or more expressions extracted from the network accessible data source through the dictionary and the corpus; and
    generating, by the processor, dialog in response to the natural language input, as a function of the cognitive context and topic of interest by integrating the one or more expressions filtered through the dictionary and corpus.

2. The method of claim 1, wherein the natural language input is selected from the group consisting of audio and video input, recorded by a recording system comprising a camera and a microphone.

3. The method of claim 2, wherein the cognitive context comprises body language and emotion recorded by the recording system during the natural language input.

4. The method of claim 3, wherein the cognitive context indicates one or more topics of interest to avoid during the analyzing step.

5. The method of claim 1, wherein the step of filtering further comprises the step of: translating, by the processor, the one or more expressions from a native language to a language of the dictionary.

6. The method of claim 1, wherein the extracting step targets extraction of expressions from the network accessible data source created by data source users having at least one parameter in common with the stored information previously known about the user.

7. The method of claim 1, wherein the network accessible data source is a social media website.

8. The method of claim 1, further comprising providing at least one support service for at least one of creating, integrating, hosting, maintaining, and deploying computer-readable program code in a computer system, where the computer-readable program code in combination with the computer system is configured to implement the steps of receiving, retrieving, analyzing, selecting, further selecting, extracting, filtering and generating.

9. A computer system, comprising: a processor; a memory device coupled to the processor; and a computer readable storage device coupled to the processor, wherein the storage device contains program code executable by the processor via the memory device to implement a method for dynamically generating computerized dialog comprising the steps of:
    receiving, by the processor, natural language input by a user;
    retrieving, by the processor, stored information previously known about the user inputting the natural language input;
    analyzing, by the processor, the natural language input for topics of interest and cognitive context;
    selecting, by the processor, a dictionary as a function of the natural language input and the stored information previously known about the user;
    further selecting, by the processor, a corpus comprising knowledge of the topics of interest;
    extracting, by the processor, one or more expressions from a network accessible data source;
    filtering, by the processor, the one or more expressions extracted from the network accessible data source through the dictionary and the corpus; and generating, by the processor, dialog in response to the natural language input, as a function of the cognitive context and topic of interest by integrating the one or more expressions filtered through the dictionary and corpus.

10. The computer system of claim 9, wherein the computer system further comprises: A recording system including a camera and a microphone, wherein the natural language input is selected from the group consisting of audio and video input, recorded by the recording system.

11. The computer system of claim 10, wherein the cognitive context comprises body language and emotion recorded by the recording system during the natural language input.

12. The computer system of claim 11, wherein the cognitive context indicates one or more topics of interests to avoid during the analyzing step.

13. The computer system of claim 9, wherein the step of filtering further comprises translating, by the processor, the one or more expressions from a native language to a language of the dictionary.

14. The computer system of claim 9, wherein the extracting step targets extraction of expressions from the network accessible data source created by data source users having at least one parameter in common with the stored information previously known about the user.

15. A computer program product comprising: one or more computer readable hardware storage devices having computer readable program code stored therein, said program code containing instructions executable by one or more processors to implement a method for dynamically generating computerized dialog comprising the steps of:

receiving, by the processors, natural language input by a user;

retrieving, by the processors, stored information previously known about the user inputting the natural language input;

analyzing, by the processors, the natural language input for topics of interest and cognitive context;

selecting, by the processors, a dictionary as a function of the natural language input and the stored information previously known about the user;

further selecting, by the processors, a corpus comprising knowledge of the topics of interest;

extracting, by the processors, one or more expressions from a network accessible data source;

filtering, by the processors, the one or more expressions extracted from the network accessible data source through the dictionary and the corpus; and generating, by the processors, dialog in response to the natural language input, as a function of the cognitive context and topic of interest by integrating the one or more expressions filtered through the dictionary and corpus.

16. The computer program product of claim 15, wherein the natural language input is selected from the group consisting of audio and video input, recorded by a recording system comprising a camera and a microphone.

17. The computer program product of claim 16, wherein the cognitive context comprises body language and emotion recorded by the recording system during the natural language input.

18. The computer program product of claim 17, wherein the cognitive context indicates one or more topics of interest to avoid during the analyzing step.

19. The computer program product of claim 15, wherein the step of filtering further comprises the step of:

translating, by the processor, the one or more expressions from a native language to a language of the dictionary.

20. The computer program product of claim 15, wherein the extracting step targets extraction of expressions from the network accessible data source created by data source users having at least one parameter in common with the stored information previously known about the user.

* * * * *